United States Patent [19]

Eichenlaub

[11] Patent Number: 5,349,379
[45] Date of Patent: Sep. 20, 1994

[54] AUTOSTEREOSCOPIC DISPLAY ILLUMINATION SYSTEM ALLOWING VIEWING ZONES TO FOLLOW THE OBSERVER'S HEAD

[75] Inventor: Jesse B. Eichenlaub, Penfield, N.Y.

[73] Assignee: Dimension Technologies Inc., Rochester, N.Y.

[21] Appl. No.: 105,811

[22] Filed: Aug. 17, 1993

Related U.S. Application Data

[63] Continuation-in-part of Ser. No. 942,718, Sep. 9, 1992.

[51] Int. Cl.$^5$ ............................................. H04N 13/04
[52] U.S. Cl. ....................................... 348/59; 348/54; 348/169; 359/466
[58] Field of Search ................... 348/169, 51, 54, 58, 348/59; 359/466; H04N 13/04

[56] References Cited

U.S. PATENT DOCUMENTS

| | | | |
|---|---|---|---|
| 4,957,351 | 9/1990 | Shioji | 359/466 X |
| 4,959,641 | 9/1990 | Bass et al. | 348/59 X |
| 5,036,385 | 7/1991 | Eichenlaub | 348/59 |

*Primary Examiner*—Mark R. Powell
*Attorney, Agent, or Firm*—Cumpston & Shaw

[57] ABSTRACT

An autostereoscopic display is adapted to have its viewing zones follow an observer's head by incorporating a device for monitoring the position of the observer's head, using the monitoring information to determine which set of light emitting lines is on in the display and which set of picture information is displayed on the picture elements (pixels), and selecting the illuminating lines relative to the light valve so that the viewing zones are continuously centered at the observer's head as the observer moves.

21 Claims, 11 Drawing Sheets

AUTOSTEREOSCOPIC DISPLAY ILLUMINATION SYSTEM ALLOWING VIEWING ZONES TO FOLLOW THE OBSERVER'S HEAD

RELATED APPLICATIONS

This application is a continuation-in-part of my co-pending application Ser. No. 07/942,718 filed Sep. 9, 1992.

BACKGROUND

1. Field of the Invention

This invention relates to autostereoscopic display devices for use in television, computer graphic, and the like viewing applications. It also relates to ultrasonic echo ranging devices designed to determine the location of a person or a person's head.

2. Prior Art

U.S. Pat. No. 4,717,949 describes an autostereoscopic display using stationary light emitting lines in combination with an image generating light valve to produce stereoscopic images that can be seen without the use of glasses or optical devices by the observer. Like most such autostereoscopic devices, this one produces images that can only be seen within certain narrow viewing zones spaced in front of the device. In order to view the images, the observer must keep his or her eyes positioned within two of several adjacent 2.5 inches (approximately 63 millimeters [mm]) wide areas in front of the display.

It is therefore an object of this invention to provide a device which can sense the position of a single observer's head, and position the optics within the stereo display so that the central viewing zone is automatically aligned on the observers head, and remains aligned on it as the person moves their head back and forth and sideways.

A further object of this invention is to provide a device that allows an observer a wide latitude for head movement and body position when using an autostereoscopic display.

Another object of this invention is to provide a device which uses head position data to alter the operation of a software program, so that the program always displays images on a screen with a perspective appropriate to the observer's eye positions.

Yet another object of this invention is to achieve the above objectives without the use of moving parts within the display.

SUMMARY OF THE INVENTION

In accordance with this invention there is provided in an illumination system for an autostereoscopic electronic display unit the improvement which comprises:

a. means to continually sense the position of an observer's head while the observer is situated in front of the display, b. electronic means to translate the measured position of the observer's head to information regarding the preferred position of vertical light lines situated behind a transmissive light valve, said preferred position being that position which causes the autostereoscopic viewing zones of the display to be centered near the observer's eyes, c. electro-optic or electro-mechanical means to cause the position of the light lines to shift sideways in either direction in order to come to the preferred position, and to continue shifting as the observer's head moves, so that the viewing zones always stays at the observer's eye location, and d. electronic and software means to use the head position data to calculate rough eye position data, and cause the image generating software to use the observer's current eye positions as the eye points from which perspective views of the image are calculated.

DESCRIPTION OF THE PREFERRED EMBODIMENT

An autostereoscopic display device having (1) a screen surface upon which is displayed, or imaged, a number of sets of thin parallel vertical light emitting lines, each set containing a multiplicity of said lines, the members of each set being located in the areas between the members of the other sets, and each set capable of being independently turned on and off, said surface remaining dark between said emitting lines, (2) a light valve array parallel to and in front of said screen, said light valve having individual picture elements, arranged in a regular pattern across its surface, said pattern possessing vertical columns of said picture elements (pixels), there being at least two vertical columns of picture elements for each of said light emitting lines in each set of said lines, said light emitting line being located behind and between said elements, so as to establish areas of space known to the art as "Viewing zones" in front of the display, within which an observer's eye sees all the light lines of a given set behind either an odd or even set of picture elements columns, (3) optionally said display is in color obtained by filtering light passing through said picture elements along said columns with filters of at least three colors, and (4) electronic means to cause the left eye image or a stereoscopic image pair to be displayed on the odd or even columns of picture elements, and the right eye image of a stereoscopic image pair to be displayed on the remaining columns of pixels is modified to follow the movement of an observer's head by— a. incorporating a device capable of monitoring the position of the head of a person who is looking at the display, b. using information from this device to determine which set of light emitting lines is on, and which set of picture information is displayed on the odd or even columns of picture elements of the display;

c. selecting which light line set is on and which set of information is displayed on which column of picture elements according to which combination of line set and image display, thus, causing the left eye viewing zone formed at the observers location to encompass the position of the observer's left eye, and the right eye zones to encompass the position of the observers right eye.

Figure 1:
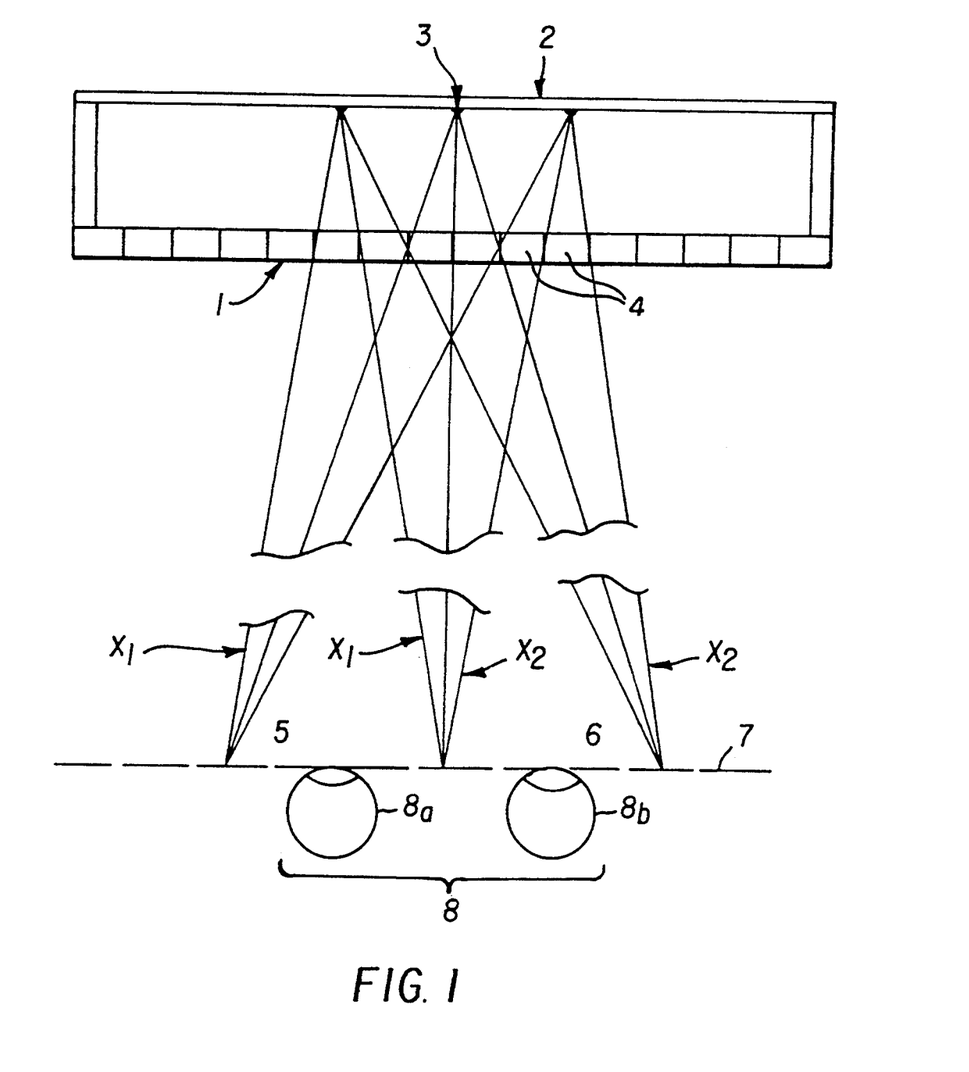
FIG. 1 is a top view of an autostereoscopic display employing a light valve and vertical light emitting lines.
Figure 2:
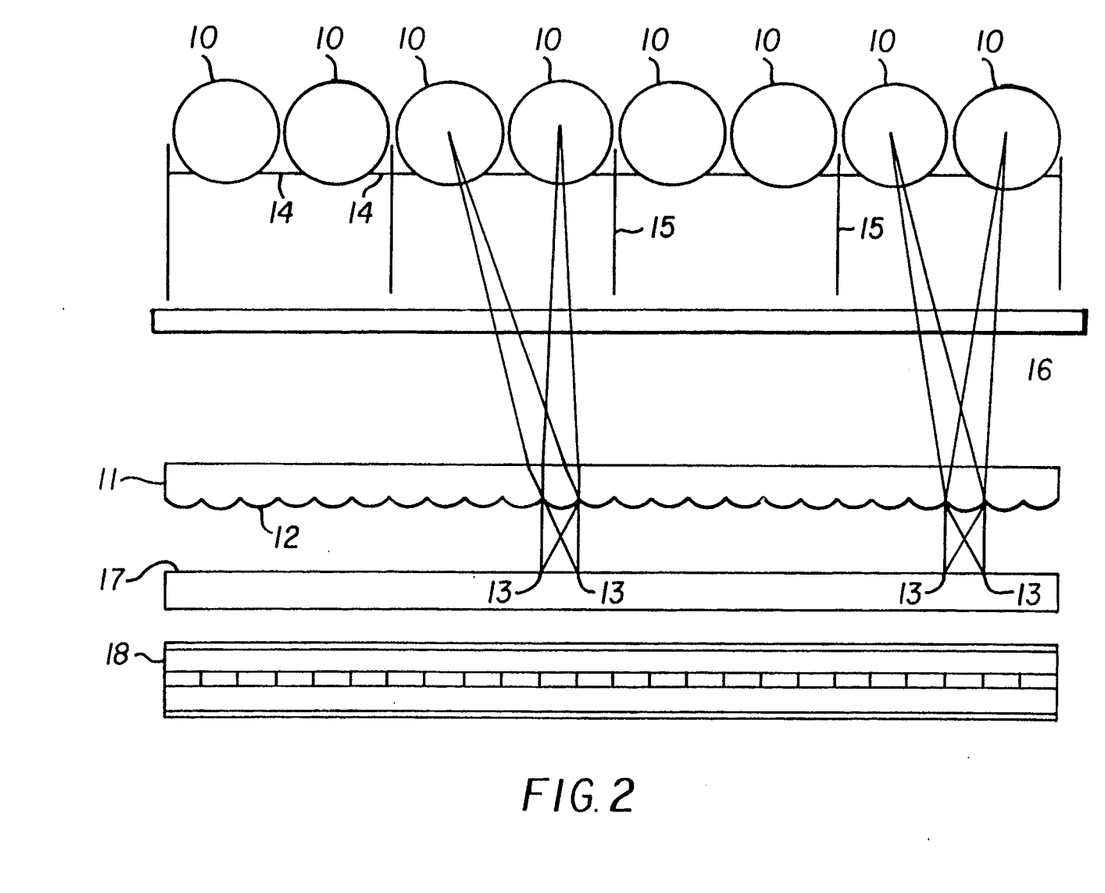
FIG. 2 is a top view of a type of an illumination system that can be used to produce light emitting lines.
Figure 3:
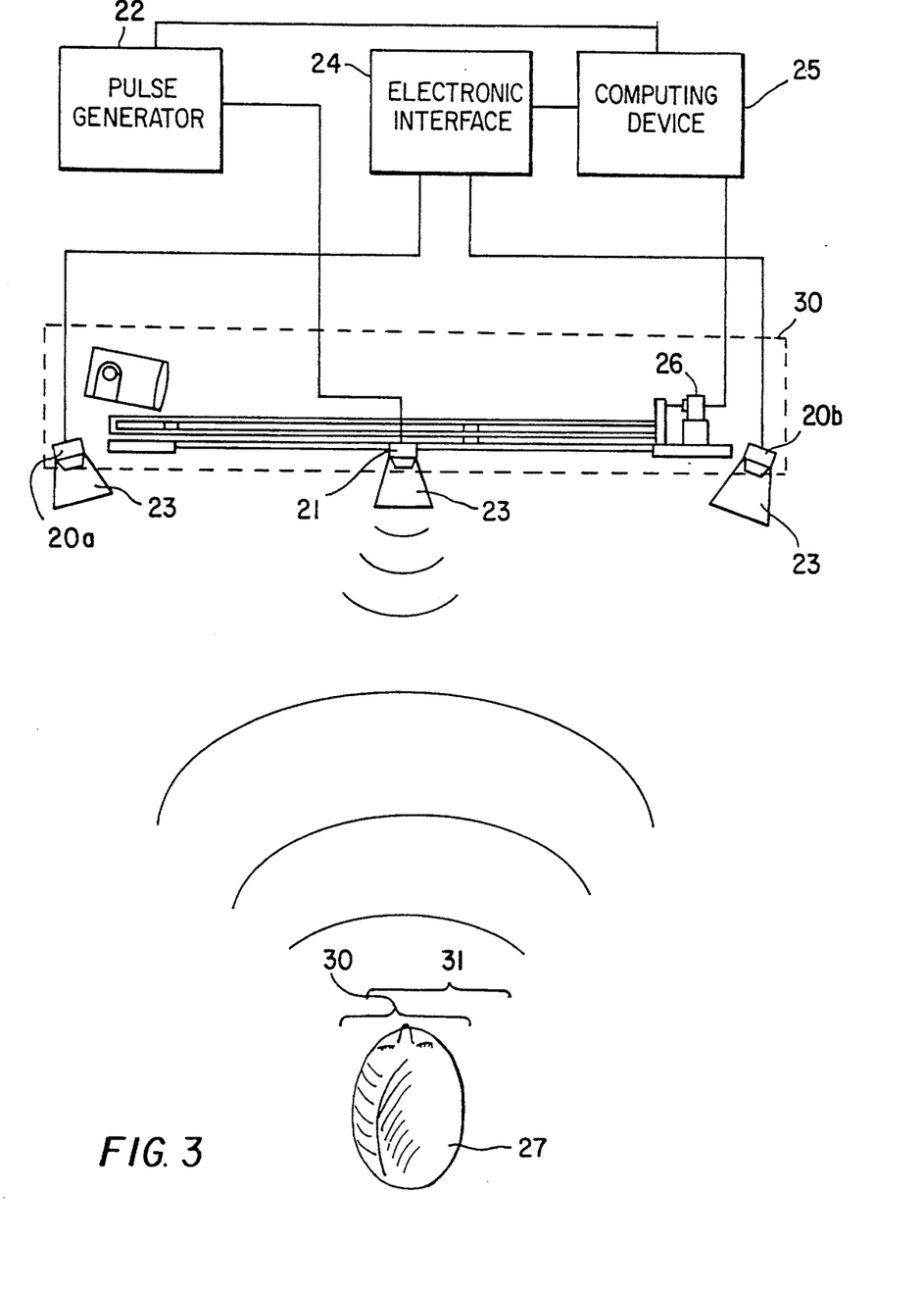
FIG. 3 is a top view of a head tracking system.

FIGS. 1, 2 and 3 illustrate the basic invention. FIG. 1 is a top view illustrating the operation of the autostereoscopic display. FIG. 2 is a top view illustrating the illumination system used in the invention. FIG. 3 is a top view of the head tracking system.

The optical system used to produce stereoscopic images that can be seen without glasses or other optical aid is described in U.S. Pat. Nos. 4,717,949 and 4,829,395.

The basic system is illustrated in FIG. 1. A transmissive light valve display 1, such as a liquid crystal display (LCD), is situated in front of and spaced apart from an illuminating device 2 which produces on a surface a large number of thin, bright, parallel vertical light lines 3. There is at least one line 3 for every pair of pixel columns 4 in the transmissive display 1. The light lines 3 are spaced apart from each other and from the LCD 1 at such a distance that an observer 8 seated at some viewing distance directly in front of the LCD 1 screen, sees all of these lines through the odd numbered columns of pixels 4 with his or her left eye 8a and all of the lines through the even numbered columns of pixels 4 with his or her right eye 8b. Thus, the left eye 8a sees only what is on the odd columns of pixels 4, and the right eye 8b sees only what is on the even columns of pixels 4. If the left eye 8a view of a stereoscopic pair is displayed on the odd columns and a right eye 8b view on the even columns, a stereoscopic image with apparent depth is perceived by the observer 8. The observer 8 will see the correct left eye 8a and right eye 8b images as long as his eyes are near an ideal viewing plane 7 and within certain viewing zones 5 and 6 whose boundaries are defined by lines running from the light lines 3 through the pixel column 4 boundaries, as shown FIG. 1.

An embodiment of the technology, the DTI 1000C color autostereoscopic display (Dimension Technologies Inc., Rochester, N.Y.), uses an illumination system described in a co-pending application Ser. No. 07/942,718 filed Sep. 9, 1992, of which this application is an extension in part. This illumination system is illustrated in FIG. 2. A bank of eight linear lamps 10, all oriented vertically, is situated behind a lenticular lens sheet 11 with a multiplicity of vertical cylindrical lenslets 12 spaced across its surface facing away from the lamps 10. Fluorescent aperture lamps and stroboscopic arc lamps are ideal for this purpose. The lenslets 12 each focus light from the lamps 10 into a multiplicity of thin vertical light lines 13 on a diffuser 17. Other features typical of such an illumination system are opaque barriers 14 and baffles 15 between the lamps, and anti-reflective coatings on most surfaces, all to eliminate scattered and reflected light. Another feature typical to such an illumination system is a variable diffuser 16 which can be made clear when a voltage is applied across it and diffuse when no voltage is applied across it, or vice versa. The diffuser 16 when placed in the optical path between the lamps 10 and the LCD 18 allows the user to switch between even, diffuse illumination for two dimensional (2D) imaging and light line illumination for three dimensional (3D) imaging. The operation of such diffusers are described in U.S. Pat. No. 5,040,878 and in the co-pending application referred to above. Again, autostereoscopic images can be formed according to the principles outlined in U.S. Pat. Nos. 4,717,949 and 4,829,365.

Figure 11:
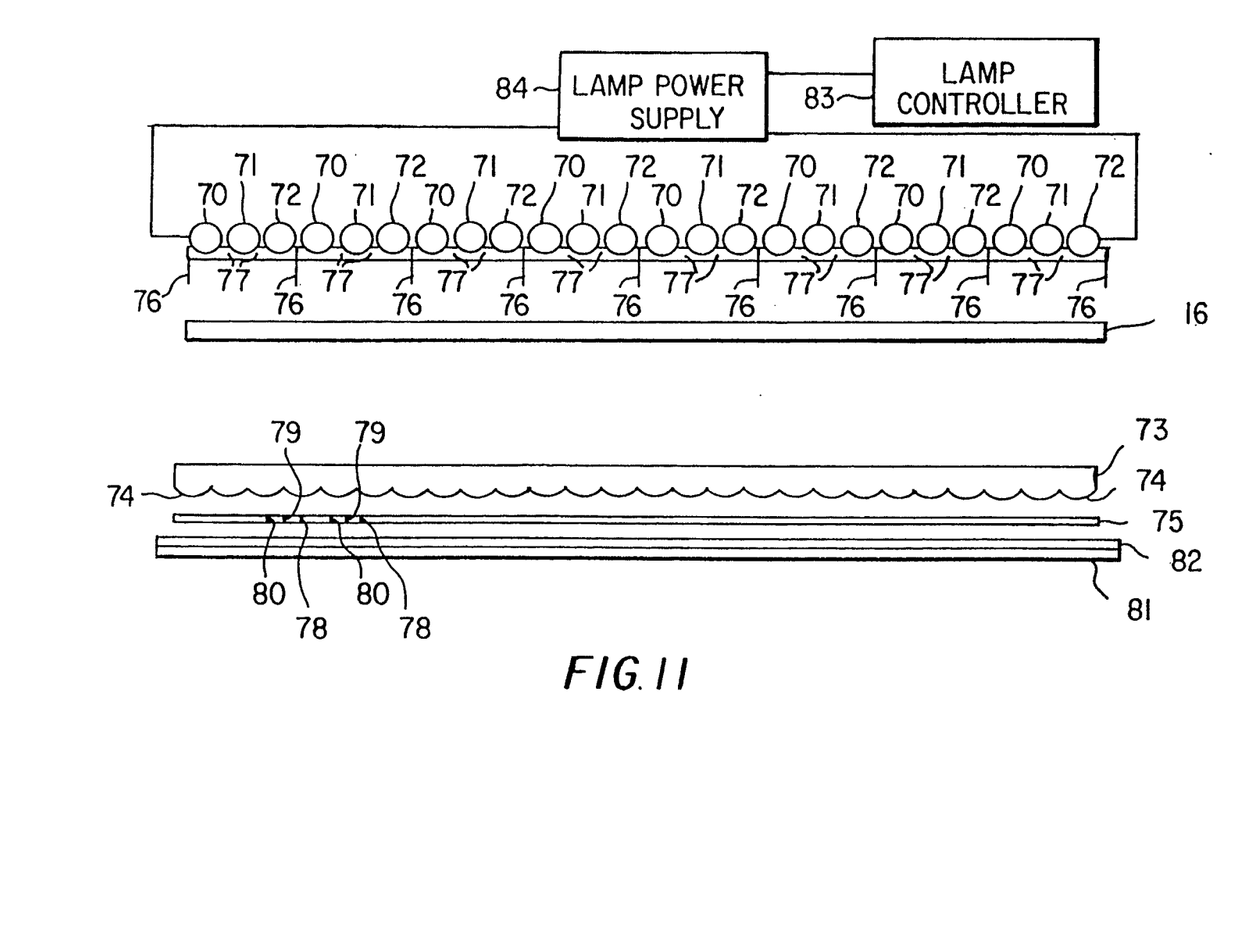
FIG. 11 is a top view of a variation of the illumination system, similar to that of FIG. 2, which can create more than one set of lines and cause the sets to independently turn on and off.

FIG. 11 (another top view) shows how a lenticular lens and linear lamp arrangement can be used to produce two, three, or many sets of independently controlled light emitting lines. In FIG. 11 independently controllable sets of lamps 70, 71, 72 are spaced behind a lenticular lens sheet or fly's eye lens sheet 73 with lenticular lenses or fly's eye lens columns 74 parallel to the lamps and oriented in a vertical direction parallel to the lamps. A diffuser 75 is again placed at the distance from the lenticular lenses where light from lamps 70, 71, and 72 are focused, and at a certain distance behind the pixel layer 82 of LCD 81. Baffles, 76, barriers 77, and anti-reflective coatings are again used to minimize scattered and reflected light. The lenticular lenses 74 image the light from lamps 70-72 onto the diffusion layer along different sets of lines 78-80, each set being at a different position on diffuser 75. The light from lamps 70 along lines 78, the light from lamp 71 along lines 79, and the light from lamps 72 along lines 80. By turning lamps 70-72 on and off independently, it is possible to cause light line sets 78-80 to independently turn on and off. Note that the number of different sets of light lines formed with this arrangement can be equal to the number of independently controllable sets of lamps. Although three sets of lamps and light lines are shown here, any number can, in theory, be used.

An electronic means 83 would be provided to turn one and only one lamp on at any given time through operation of lamp power supply electronics 84. In this embodiment of the invention, the electronics switch between the lamps according to information received from a observer's head position sensing device to be described. Electronic means 83 is typically a microprocessor based device that is capable of turning different lamps on and off according to input in the form of X, Y and Z Cartesian coordinate head position information. As before fluorescent lamps or arc strobe lamps would be ideal for this application.

This illumination system is, of course, not the only way to produce either single, stationary, sets of light emitting lines or multiple sets of light emitting lines in different locations that can be turned on and off independently. Other possible systems include the embodiments using a special side illuminated reflector plates described in U.S. Pat. No. 5,040,878.

Other methods of producing different sets of light lines in different positions behind an LCD with light from different sources, as well as variations of the systems described above, will be apparent to those skilled in the art. For example, variations on the system described above include the use of a fly's eye lens array instead of the lenticular lens, and use of columns of point like light sources instead of linear vertical oriented light sources.

FIG. 3 illustrates a head tracking system that can be used with displays employing the illumination systems described above. As a representative example of a head position sensing device, three ultrasonic transducers 20a, 20b, 21 are positioned along the top of the display case 30 of FIG. 3. In practice, such position sensors are not limited to ultrasonic transducers. A number of different types of sensors can provide information on the head position, to be used by the mechanical or electro-optic methods described above to shift the position of the light lines. For example, the Polhemus Company makes an electro-magnetic sensor which, combined with an element that can be worn on the body or head, is capable of determining the location of the element to a high degree of accuracy. The Polhemus system is particularly effective in situations where a helmet is worn, since the element can be mounted unobtrusively on or within the helmet. Another type of sensor uses infrared light reflected off the head to determine the head's location. Origin Instruments makes such a sensor, which reflects infrared light off of a small reflective spot attached to the forehead or glasses. Another infrared system described by Pund in U.S. Pat. No. 4,649,425, reflects light directly off the head and does not require the user to wear any reflective device. Those familiar with the art will be aware of other types of head position sensors and other variations of the types just described.

In the ultrasound system of FIG. 3, an electronic pulse generator 22 causes the middle transducer 21 to periodically send pulses of ultrasound into the environment. The other two transducers 20a, 20b mounted near the sides of the display, listen for return echoes. Generally, all the transducers will be located at the back of horn reflectors 23 to concentrate the outgoing beam in a forward direction, and shield the listening transducers 20a, 20b from sound coming from anywhere but the forward direction.

Upon receiving ultrasonic energy, receiving transducers 20a, 20b send a signal to electronic interface 24 whose amplitude is proportional to the intensity of ultrasonic wave being detected at any given moment. Electronic interface 24 contains a filter which notes the time at which the first signal above a certain intensity is received. This signal will be a signal from the closest point on the closest object to the transducers.

A computing device 25, such as a microprocessor, uses the times measured between the emitted pulse from the central transducer 21 and the received echo from the two receivers 20a, 20b to calculate the position of the object, presumably the observers head 27, which is causing the echo. A variation of the ultrasound device places the central transducer 21 on a clip on device worn by the user, instead of mounting it on the display 30. This can be attached to the users clothing directly below the center of his or her face. The transducer 21 should ideally be powered by a battery so that no cords or other devices are needed between the observer 27 and the display or other power source.

All of the head position sensors described above have in common the ability to determine the position of the head 27 in at least one dimension namely the horizontal direction parallel to the screen surface. Ideally, the head position in the other two dimensions, forward and back from the screen, and vertically, can also be determined. The Polhemus device can determine head position in all three dimensions, and the Origin Instruments and Ultrasound device described can determine position in the Y (side to side, horizontal) and Z (toward and away from the display) dimensions. In certain situations it may be desirable to use more than one of such sensing devices in combination, in order to determine the observer's positions in all coordinates.

Information on the head's 27 position is used by the microprocessor 25 to change the position of the light emitting lines behind the display, thus causing the viewing zones to move sideways, to stay centered on the observer's head 27.

Figure 4:
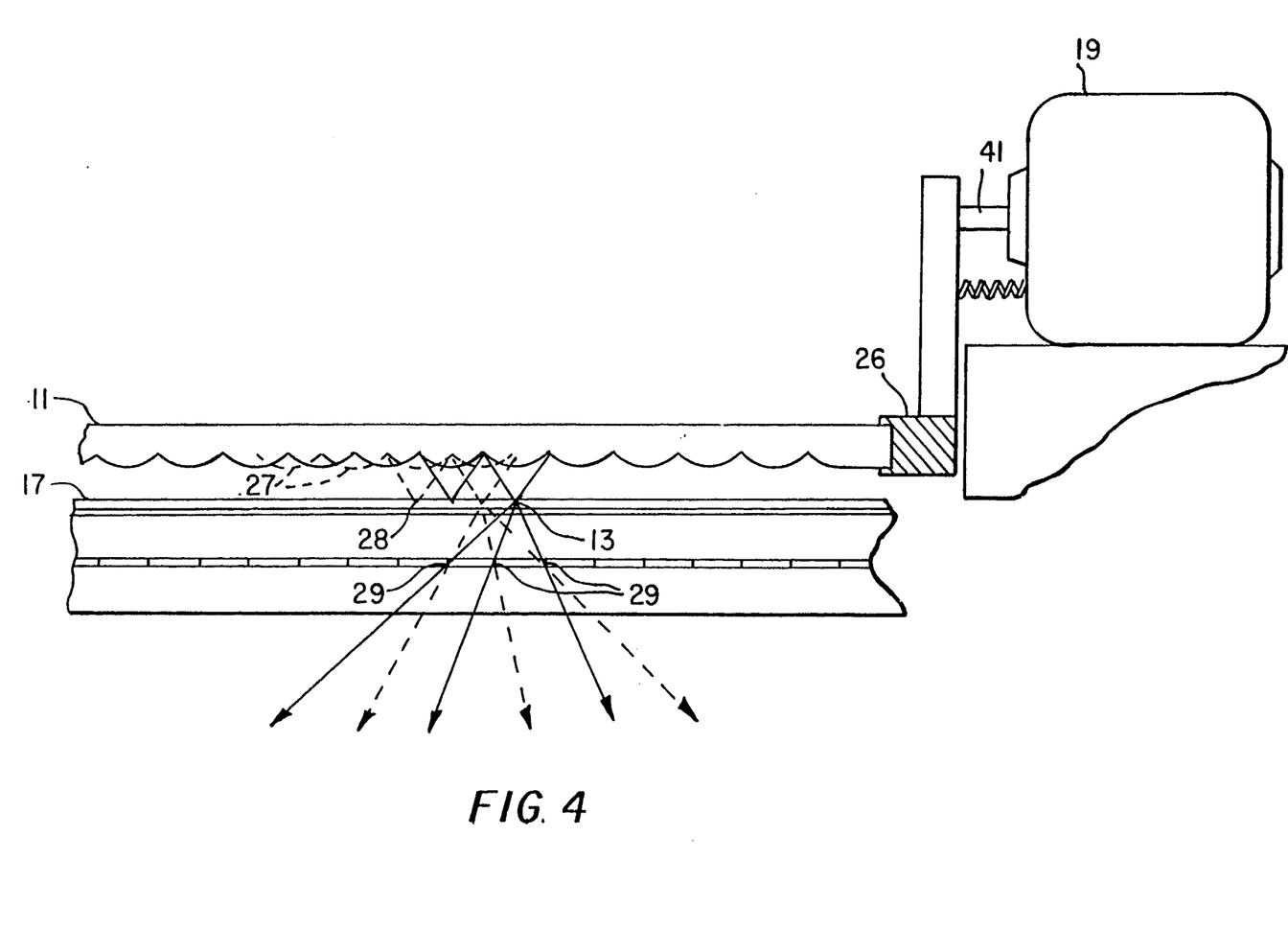
FIG. 4 is a close up of the lenticular lens of FIG. 2, with a slide mechanism and motor that can cause the lens, and thus the light lines and autostereoscopic viewing zones, to move sideways.

A method of accomplishing this with the illumination system shown in FIG. 2 is shown in the magnified view in FIG. 4. Here, a motor 19 is attached to a slide mechanism 26 within which the lenticular lens 11 of FIG. 2 is held. Signals from the microprocessor 25 cause the stepping motor 19 to extend or retract its shaft 201, causing the slide mechanism to move. As the slide moves, the illuminating lines 13 formed on the diffuser 17 move sideways relative to the pixels 4 on the LCD 1 (not shown), and the viewing zones shift position. For example, in FIG. 4 if the lenslets 12 are shifted to positions shown in dotted lines 27 the lines 13 shift from positions 13 to new or second positions 28, and the viewing zones move horizontally, as shown by the change in direction of the arrows from the light lines 13 through the boundaries 29 of the pixels 4 in the liquid crystal layer 17 of LCD.

The motor 19 used is ideally a stepper motor, but can also be a continuous motor with a reduction gear system which moves a shaft only a small amount per revolution of the motor armature.

The distance that the lines must shift in order for the viewing zones to follow a person's head 27 across a distance $D_h$ equal to $S(D_h/Z)$, where S is the distance between the light lines and the image forming pixels, $D_h$ is the distance that the person's head moves, and Z is the distance from the person's head to the image forming pixel layer.

FIG. 4 illustrates a method of moving the line that requires moving parts. However, it is possible to perform head tracking without moving parts by using different sets of lines that turn on and off, using an illumination system similar to that shown in FIG. 11, which can form multiple sets of light emitting lines in different positions by turning lamp sets on and off as was described earlier. A head tracking system without moving parts has advantages over a moving parts system including superior ability to keep the zones positioned on the observers eyes, and superior reliability under adverse conditions such as the high gravity forces and vibrations encountered within an aircraft.

Figure 5:
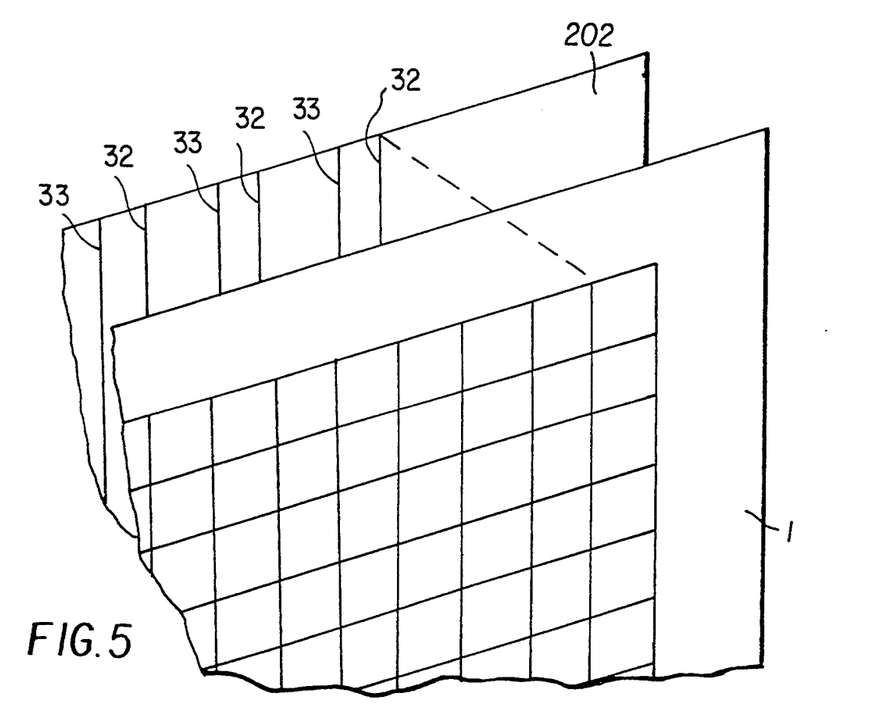
FIG. 5 is a light valve and illumination system that produces two independently controllable sets of lines, which can be used to cause viewing zones to move sideways without moving parts.

A method of doing this with two sets of lines is illustrated in FIG. 5. A surface, such as a diffuser 202, upon which two sets of light emitting lines 32 and 33 can be displayed is spaced behind LCD 1 as shown. Each set of lines can be turned on and off independently, and furthermore circuitry is provided to turn one set off whenever the other set is on and visa versa. Such independently controllable sets of light emitting lines can be formed by the lenticular lens arrangement of FIG. 11 if two independently controlled sets of lamps are used.

Figure 6A:
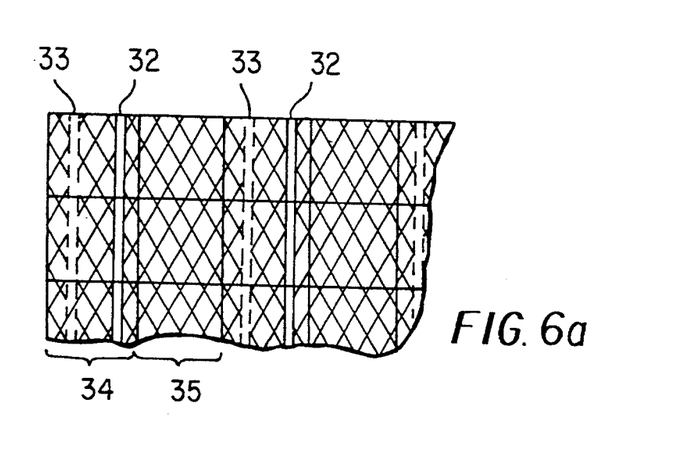
FIGS. 6a through 6c are a magnified view of how the embodiment of FIG. 5 looks to an observer's eye while the system is in use.
Figure 6B:
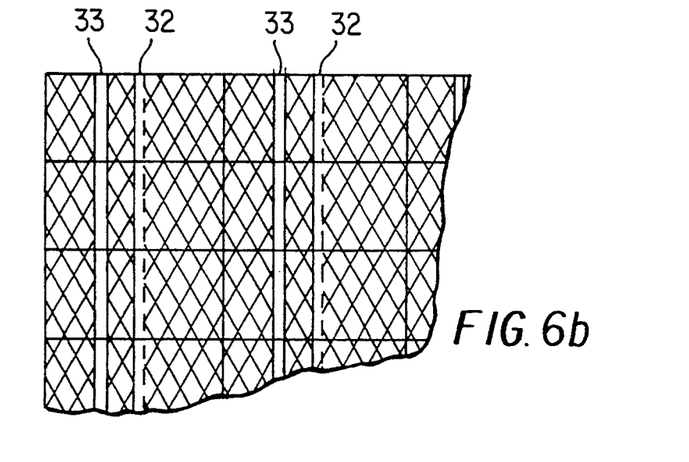
Figure 6C:
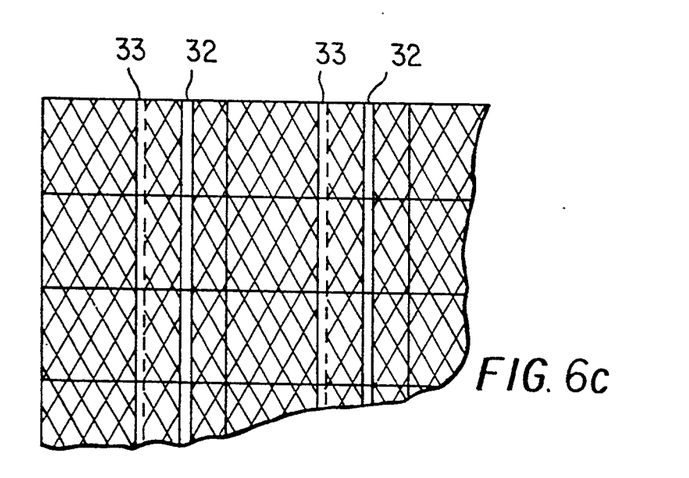

FIGS. 6a–6c illustrate how the arrangement of FIG. 5 looks to the left eye of an observer sitting in front of the display. Light line set 32 is assumed to be on. As the observer moves to the right, line set 32 seems to get closer and closer to the boundary between the odd pixel columns 34 and the even pixel columns 35, as shown in FIG. 6a. At some point before the line appears to reach the boundary, line set 32 is turned off and line set 33 is turned on, as shown in FIG. 6b. Line set 33 is seen to still be well away from the pixel boundary, so the observer can continue moving to the right without crossing a zone. At some point after the line set 32 has crossed the boundary, but before line set 33 reaches the boundary, set 33 is turned off and set 32 is turned on again, as shown in FIG. 6c. Since line set 32 is now seen to be behind the even pixel columns by the left eye, the computer must simultaneously switch the left eye view image on the odd columns over to the adjacent even columns, and switch the right eye view to the odd columns. This can be accomplished by writing a new image with the right eye view on the even columns and a left eye view on the odd columns.

As the observer continues to move, it is possible to repeat the process illustrated in FIG. 4 as the lines appear to move across successive pixel columns. If the observer then moves to the left, the process is repeated in reverse.

Figure 7:
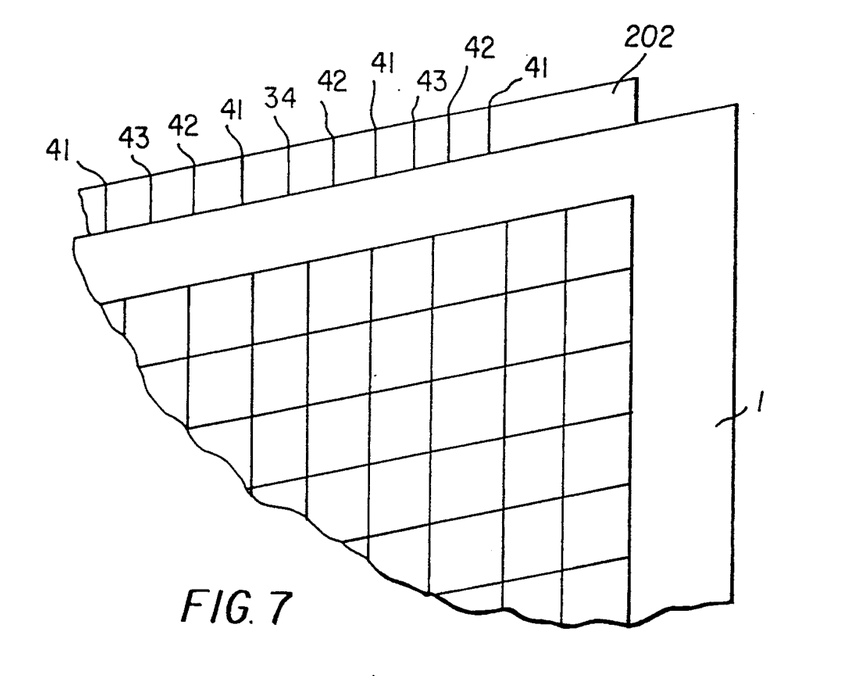
FIG. 7 is another specific embodiment that causes the viewing zones to move sideways using three sets of light emitting lines.

FIG. 7 illustrates a light line illumination arrangement that can accomplish this process without an image flip when three or more lines are used. Here, three line sets 41, 42 and 43 are shown spaced on the diffuser 202 behind the LCD 1. Each set can be turned on and off independently. Furthermore, electronic means are provided to cause one set of lines to turn on at any given time.

Figure 8A:
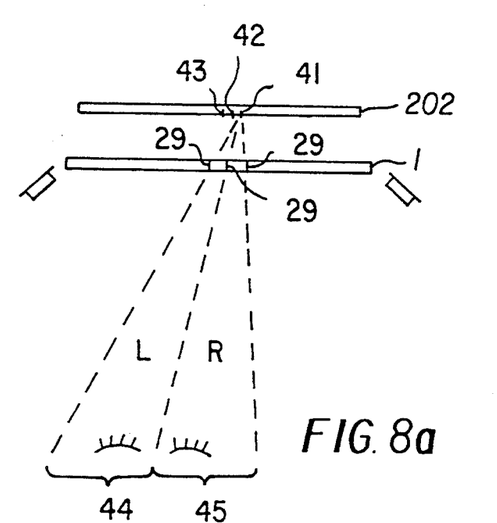
FIGS. 8a through 8c are a top view of the system of FIG. 7.
Figure 8B:
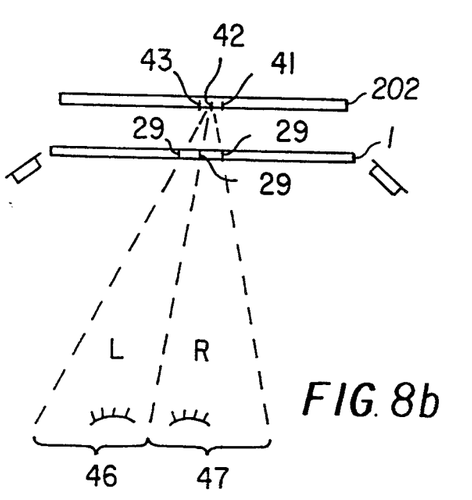
Figure 8C:
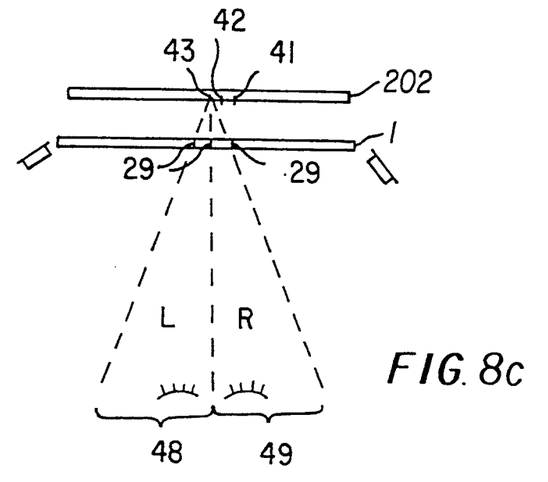

FIGS. 8a–8c show how the viewing zones formed by the light lines in FIG. 7 move sideways as the light lines change position. When the lines 41 are on, the central left and right viewing zones are formed in positions 44 and 45, with the borders of the two central viewing zones defined by imaginary lines between the light lines and the boundaries 29 of the odd and even pixel columns of the light valve, as shown in FIG. 8a, according to the principles described in U.S. Pat. No. 4,717,949. As described in that patent, there are a number of such zones spaced evenly across a plane parallel to the display. Only two are shown here for clarity. When lines 42 are on, the viewing zones move to positions 46 and 47 in FIG. 8b. When lines 43 are on, the zones move to positions 48 and 49 in FIG. 8c.

Figure 9A:
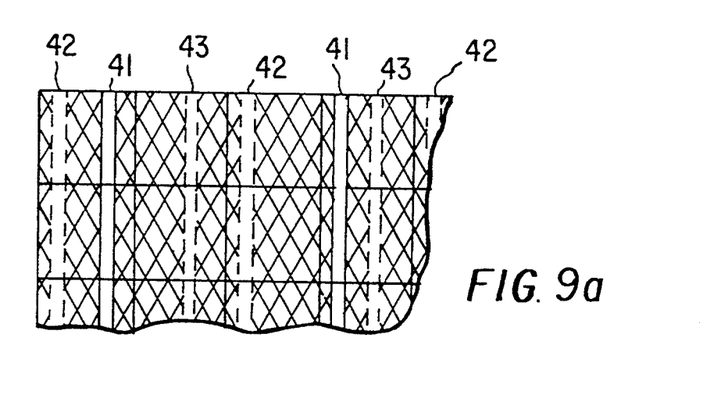
FIGS. 9a through 9c are a magnified view of how the embodiment of FIG. 7 looks to an observer's eye while the system is in use.
Figure 9B:
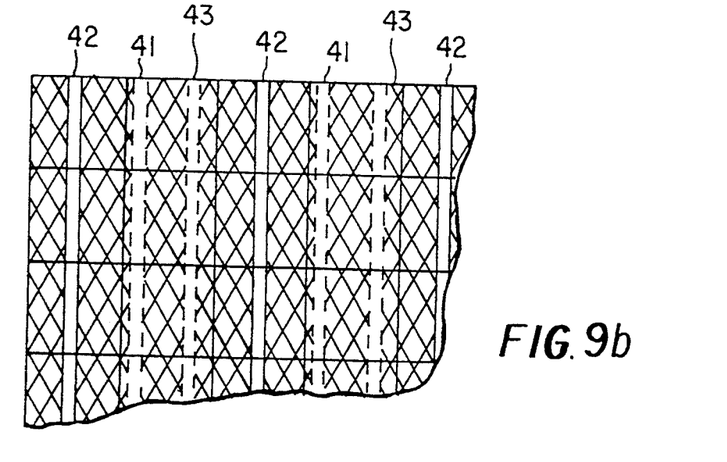
Figure 9C:
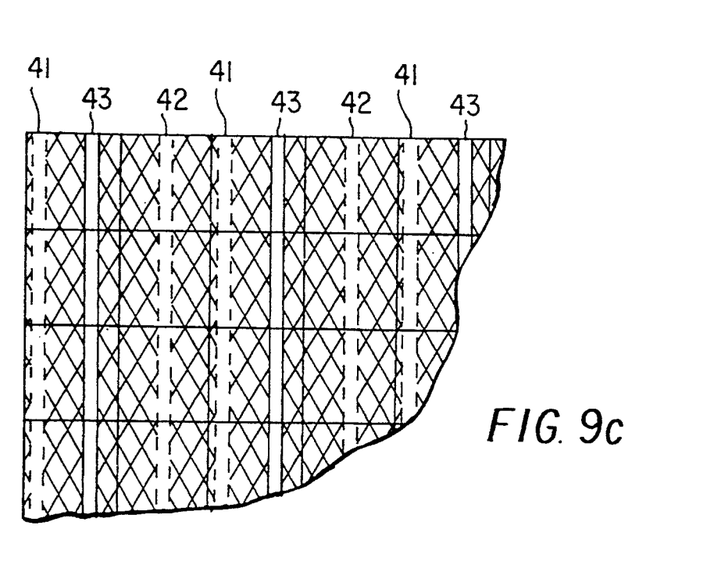

FIGS. 9a–9c illustrate how this arrangement looks to an observer's left eye. Line set 41 is assumed to be on. As the observer moves to the right, line set 41 appears to approach the boundary between the pixel columns as shown in FIG. 9a. Before this occurs, set 41 is turned off and set 42 is turned on. As the observer continues to move, set 42 seems to approach the pixel boundary as shown in FIG. 9b. Before it crosses the boundary, set 42 is turned off and set 43 is turned on. As the observer continues to move, set 43 will eventually be seen to approach the boundary as shown in FIG. 9c. Before it crosses the boundary, set 43 is turned off and set 41 is turned back on. When set 41 is turned on again, the observer has moved so that his or her eyes are now in the two viewing zones adjacent to the central pair of zones where the observer started. This process can be repeated continuously as the observer moves, without any image flip between columns being necessary. If the observer moves to the left, the process can be repeated in reverse.

When more than three sets of light lines are used, the process is identical, with one light set coming on after its neighbor as the observer moves, except that since a larger number of light line sets with smaller space between them is used, more viewing zone positions are produced and the centers of the viewing zones can be more closely matched to the positions of the observer's eyes.

When only three sets of light lines are used, an image flip at every light line change may still be used to good effect, since it can allow the viewing zones centers to remain closer to the observer's eyes.

Figure 10:
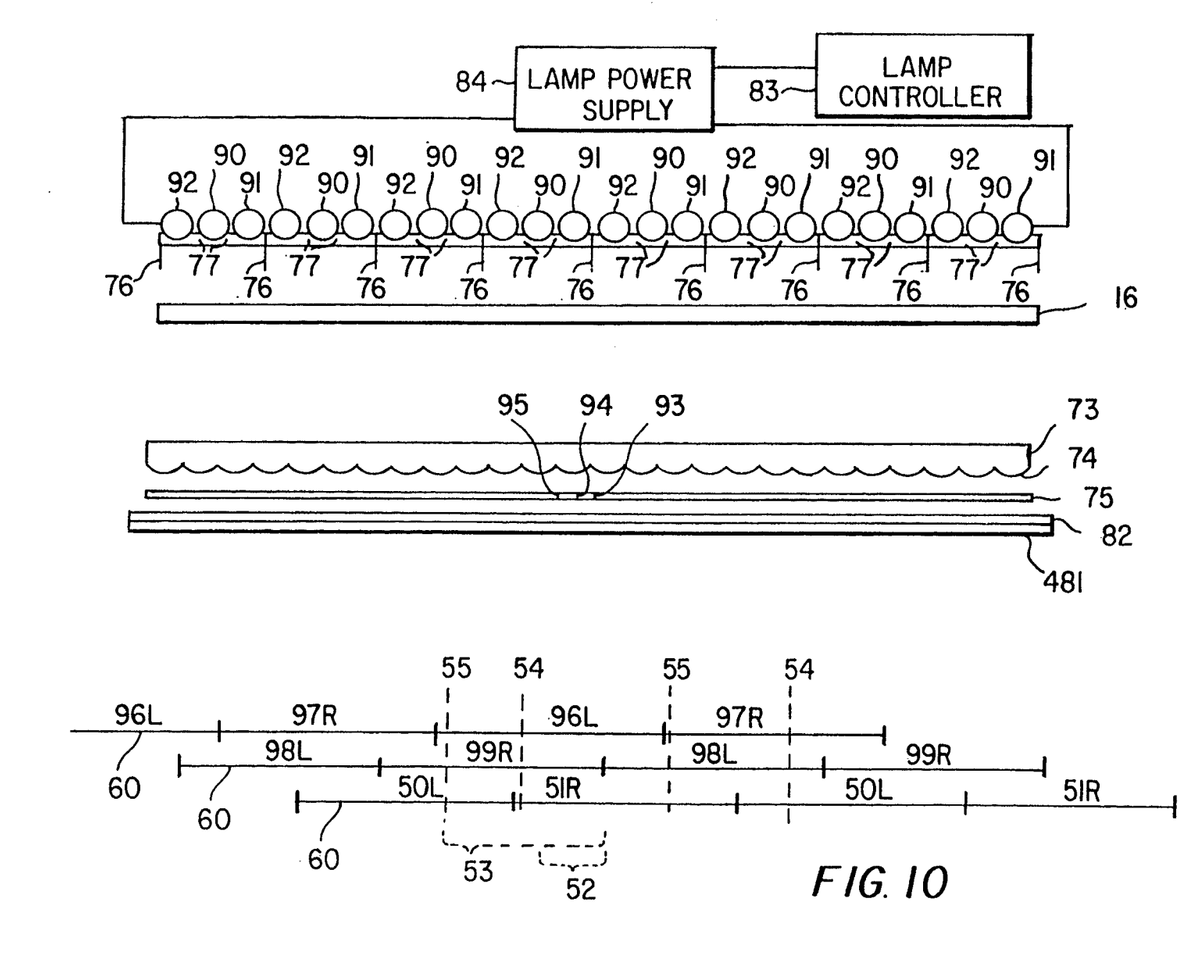
FIG. 10 is a top view showing the various viewing zones formed by the three sets of light lines shown in FIG. 7, and how they over lap.

Use of an image flip with three lamp sets is illustrated in FIG. 10. Here, lamps 90, 91, and 92 create light line sets 93, 94 and 95. In turn the light lines 93 shining through the LCD pixels create viewing zones 96, 97; light lines 94 create viewing zones 98, 99 and light lines 95 create viewing zones 100, 101. Each of the even numbered zones is assumed to be a left eye zone, and each of the odd numbered zones is assumed to be a right eye zone. They are marked in FIG. 10 with an "L" for left or "R" for right, respectively. Although the three sets of zones are shown to be spaced at slightly different distances from the display, this is only done to provide clarity. The horizontal lines 110, representing the ideal viewing plane where the zones are widest, are in reality coincident.

When no image flip is used, the system will have to switch lamps when the observer's eyes are in regions such as region 102 where two left eye or two right eye zones overlap. These overlap regions are rather narrow. If, however, and image flip is used every time a lamp is switched, the switch can occur whenever the eyes are in wider regions 103, where left eye zones overlap with right eye zones. The overlap distance between these sets of zones is twice as large as the overlap between the others, as can be seen in the drawing.

Operation of the three lamp system with an image flip during observer movement is shown in FIG. 10. The observer's eyes are initially in zones 96 and 97 and the observer is assumed to be moving left. As the eyes reach the horizontal positions 104, lamp set 90 turns off and lamp set 91 turns on, forming new zones 98 and 99. Normally, this would put the left eye in a right eye zone and vice versa, However, simultaneously, the images switch between columns, causing zones 98 to become right eye zones and zones 99 to become left eye zones, thus keeping the right eye image visible to the right eye and the left eye image visible to the left eye.

If the observer continues to move left, to the positions 105, lamps 91 now turn off and lamps 92 come on, causing the zones to move to positions 101 and 102. Once again, an image flip occurs. If the observer still continues to move, lamp set 91 can come on again when the eyes have reached point 106. By continuously turning the lamp sets on and off in the order 90, 91, 92, 90 . . . and flipping the images between columns after every lamp change, one can cause the zones to track the observers eye positions as the observer moves to the left. If the observer moves to the right, the order of turn on and turn off of the lamps is reversed, and an image flip still occurs at every lamp switch. Note that the order in which the lamps turn on is the reverse order in which they turn on when no image flip is used with the three lamp system.

In any of the previous arrangements, if the observer stops at or near the location that causes the line sets to switch, the systems just described may cause the lines sets to switch and off and the images to flip continuously. This will likely be annoying to the viewer. To prevent this problem, hysteresis can be introduced into the control system. This is illustrated in FIG. 12.

Figure 12:
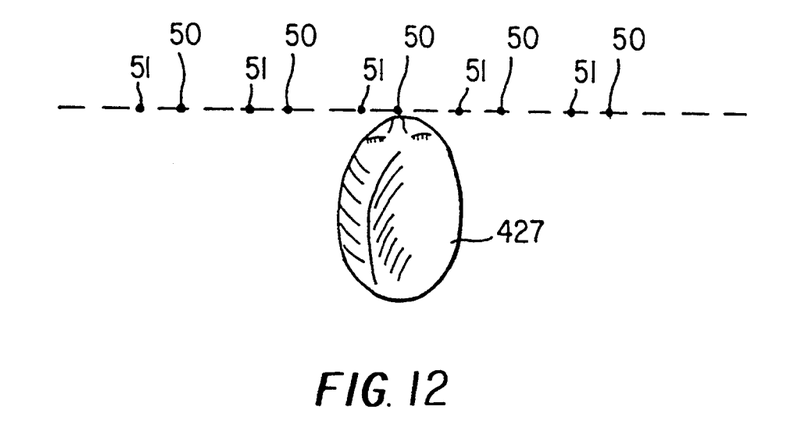
FIG. 12 illustrates how the head tracking system operates with a hysteresis feature added.

In FIG. 12, as the observer 27 moves to the right, there will be certain points, 50 which when crossed will cause the controller to switch line sets and or flip images. The controller can be programed so that, when the observer stops and moves back to the left, the switching back to the original state does not occur until the observer gets to the points 51. Thus if the observer stops at or near any of the points 50 or 51, a single line switch and or image flip will occur, and the system will stay in that state until the observer has moved a considerable distance one way or the other.

When the systems described above use an image flip between pixel columns, then it is desirable, when switching between one set of lamps and the next, to keep both lamps off during all or most of the short period when the pixels on the LCD are changing to flip the positions of the left and right eye images. Otherwise, a double image become visible for an instant, during the short time the pixels of the display are changing from one state to the next. If strobe lamps are used, the short time interval between lamp flashes can be timed to occur at the end of the address of the LCD, and be of such a length that the pixel complete all or most of their change by the time the next lamp flash occurs.

It is desirable in many applications to be able to switch between 3D image display, in which each eye sees different pixels on the LCD and 2D image display, in which both eyes see all the pixels. In a system with three or more sets of lamps, this can be accomplished simply by turning on all the lamps at once. With all the lamps on, light lines are seen behind all the pixels by each eye, and thus full resolution 2D images can be viewed. A switch can be provided for this purpose. At one position, the switch allows only one set of lamps to be on at any given time. In the other position it turns all the lamp sets on. Note that if a large number of lamp sets are used, it is not necessary to turn on all of them in order for a light line to become visible behind every pixel. It is generally desirable, when turning on multiple lamp sets on for 2D viewing, to turn down the power provided to each lamp, so that the overall brightness of the display remains roughly constant, even though many more lamps are on. The variable diffuser 16 of FIGS. 10 and 11 can also be used to good effect for 2D viewing in a multiple lamp set system. If the variable diffuser is turned to its diffuse condition when multiple lamp sets are turned on for 2D viewing, very even illumination will result.

With any of the multiple line set or mechanically moving line set methods described above, it is possible to add a so called look around feature through the use of the proper image generating software and interface between the software and the head tracker. When the observer is in a certain position directly in font of the screen, a stereoscopic image made up of two perspective views of some scene is shown on the screen. The actual images of the scene on the display surface are two projections of the points on the imaginary 3D objects onto the screen surface along lines running between the points in imaginary space and the observer's two eye locations. The drawing of images in this way is well known to those familiar with the art of computer graphics as applied to stereoscopic and autostereoscopic displays.

As the observer moves sideways or back and forth, the computer continuously redraws the scene so that the perspective views are drawn as projections toward the observer's new eye locations. Thus, the observer will always see perspective views of the scene that are identical to the views that would be perceived of real objects in space as viewed from the observers current location. Thus the observer will be able to move her head to look around corners or behind objects and so forth, and perhaps more importantly, will always see a 3D image with minimal distortion. This will greatly enhance the apparent realism of the scene. Origin Instruments sells a software package that performs this function on simple images when used with their infrared head position sensing system.

In some applications, however, a different scheme would be more desirable for elimination of the distortion in the image when seen from off axis. For example, in some avionics applications the pilot sees a representation of an imaginary path in the sky to follow, which extends from near the display out to infinity. If displayed in 3D, this path will be seen as if through a small window at the display surface. Obviously, if the pilot moves his or her head to the side when the look around software described above is in use, all but the nearest parts of the pathway will disappear behind the edge of the window, as distant objects always do because of perspective. This would be very undesirable.

If no look around software of the type described is used, the image will stay the same on the screen and the observer will still be able to see all of it as he moves around, but it will appear to be distorted when viewed from all positions except one, as is well known to those familiar with stereoscopic display systems.

A much more desirable arrangement would be to use software that continuously redraws the image as projected to two eye points coincident with the pilot's eyes, as before, and simultaneously causes the scene image to rotate around an imaginary point at the center of the display in such a way that the same axis within the image space is always pointed at the spot between the observer's eyes. Thus, the pilot would always see an undistorted image of the pathway that seems to extend directly away into the distance, but does not become hidden behind the edges of the display. Note that with either system, the image redraws can be performed to accommodate observer movement along any direction, up and down, in and out as well as sideways, provided that the head position sensor provides information on the head position in these dimensions.

With any of the light line moving systems described above, it is desirable to provide a means by which an observer can initially position the viewing zones to center them precisely on his or her eyes when he or she is seated in the most comfortable position. This will correct for any erroneous positioning caused by variables such as posture, eye separation, echoes from headgear and the like. For this purpose, a switch may be provided, ideally located on the display case, and ideally being a spring loaded three position rocker switch. In the left position, the switch would cause a mechanical or electro-optic optic mechanism to take the actions necessary to shift the viewing zones to the left one step at a time. In the middle position, to which the switch would return when not pressed, nothing would occur—this would be a neutral position. When pressed into the right position, the switch would cause electrical connections which caused the light line repositioning system to move the lines to the left, thus moving the viewing zones to the right one step at a time.

When multiple users are observing the display, it will be desirable to turn the head tracker off, since the tracking schemes just described can only track and follow one person's head. The zone movements necessary to track this person's head will not be appropriate for the other users, since their heads will more than likely be undergoing different motions than the tracked user. Thus a switch should be provided to turn the head tracker on and off independently of the display.

The foregoing examples and methods have been described above for the purpose of illustration and not limitation. Many other modifications will naturally suggest themselves to those skilled in the art based on this disclosure. These are intended to be comprehended as within the scope of invention.

It is claimed:

1. In an autostereoscopic display device having (1) a screen surface upon which is displayed, or imaged, a number of sets of thin parallel vertical light emitting lines, each set containing a multiplicity of said lines, the members of each set being located in the areas between the members of the other sets, and each set capable of being independently turned on and off, said surface remaining dark between said emitting lines, (2) a light valve array parallel to and in front of said screen, said light valve having individual picture elements, arranged in a regular pattern across its surface, said pattern possessing vertical columns of said picture elements, there being at least two vertical columns of picture elements for each of said light emitting lines in each set of said lines, said light emitting line being located behind and between said elements, so as to establish areas of space known to the art as "Viewing zones" in front of the display, within which an observer's eye sees all the light lines of a given set behind either an odd or even set of pixel columns, (3) optionally said display is in color obtained by filtering light passing through said picture elements along said columns with filters of at least three colors, and (4) electronic means to cause the left eye image or a stereoscopic image pair to be displayed on the odd or even columns of pixels, and the right eye image of a stereoscopic image pair to be displayed on the remaining columns of pixels; the improvement which comprises—
   a. incorporating a device capable of monitoring the position of the head of a person who is looking at the display,
   b. using information from this device to determine which set of light emitting lines is on, and which set of picture information is displayed on the odd or even columns of pixels of the display;
   c. selecting which light line set is on and which set of information is displayed on which column of pixels according to which combination of line set and image display,
   thereby causing the left eye viewing zone formed at the observers location to encompass the position of the observer's left eye, and the right eye zones to encompass the position of the observers right eye.

2. The device of claim 1 wherein two sets of independently controlled light lines are produced, the members of each set being substantially to the left or right of the center line halfway between the members of the other set.

3. The device of claim 2 wherein, as the observer's head moves horizontally left or right, with his or her eyes within the viewing zones created by one light line set, so that the observer's eyes approach the boundaries of the viewing zones, that light line set turns off and the other set comes on, so that the new viewing zones formed by the second set now encloses the observer's eye locations; and as the observer continues to move, and the eyes approach the zone boundaries formed by the second set, the second set turns off and the first set turns on again, and simultaneously the left and right eye image information is switched between the odd and even pixel columns, such that when the first set comes on again, left and right eye viewing zones are again positioned so as to enclose the observer's eye locations.

4. The device of claim 1 where the locus of the observer positions at which the light lines switch when the observer is moving to the right are to the right of the locus of positions where the light lines switch when the observer is moving to the left, so as to not cause the light line sets to switch rapidly when the observer is near a position where a change occurs.

5. The device of claim 1 where n sets of light lines are present, n being a whole intruder greater than 2, and as the observer who's eyes are within the viewing zones moves to the left or right, with one light lines set on, defined as set one, and the as the observer's eyes move off center and thus approach the boundaries of the viewing zones, set one turns off and set two, generally being the next set in the direction opposite the observer's movement, turns on in order to create viewing zones that are more centered on the observer's eyes.

6. The device of claim 1 wherein three sets of light lines are present, and as the observer who's eyes are near the center of the viewing zones moves to the left or right, with one light lines set on, defined as set one, and the as the observer's eyes move off center and thus approach the boundaries of the viewing zones, set one turns off and set two, being the next set in the direction the same as the observer's direction of movement, turns on, while simultaneously the left and right eye images on the screen are switched between the odd and even columns,in order to create viewing zones more centered on the observer's eyes, so as to create left and right eye viewing zones which encompass the observer's left and right eyes, respectively.

7. The device of claim 1 where as the observer moves and different line sets turn on, software simultaneously and continuously redraws the scene in successive frame so as to change the perspective of the left and right eye views on the screen in a manner which is dependent on the observer's current location.

8. The device of claim 7 where the scene is redrawn so as to draw the scene with perspective seen from the observer's current eye positions, so that as the observer moves, the observer will always see the scene without appreciable distortion and can look around and over objects in the scene.

9. The device of claim 7 where the scene is redrawn in such a way that the entire scene rotates around a point at or near the display surface in such a way that an imaginary line in image space running between the point of rotation and a point between the observer's eyes always stays positioned between the observer's eyes, so that the same perspective view of the image is seen by the observer without appreciable distortion as the observer moves.

10. The device of claim 1 where all or more than one set of light emitting lines can be turned on simultaneously so the light is seen behind every pixel by each of the observer's eyes, thus allowing the observer to easily see full resolution two dimensional images displayed on the light valve.

11. The device of claim 1 where an ultrasonic emitter is worn by the observer, and two or more receivers are mounted at or near the display device, in order to obtain information on the observer's head position through triangulation.

12. The device of claim 1 where a device which can be changed from a diffuse to a transparent condition is placed in the optical path between the light line generating means and the light valve picture element layer in such a way that when the device is in a diffused condition, light from the light line generating means is diffused, so that diffuse, even illumination emanates from the variable diffusion device, so that light is seen behind every picture element by each of the observer's eyes, thus allowing the observer to easily see full resolution two dimensional images displayed on the light valve.

13. The device of claim 12 where more than one set of light lines is turned on when the variable diffusion device is in the diffuse state to improve the evenness of the illumination behind the light valve when it is used for two dimensional viewing.

14. The device of claim 1 where the illumination system used to create the light lines comprises more than one set of linear light sources or pointlike light sources arranged in columns, each set being capable of being turned on and off independently of the others, a fly's eye or lenticular lens sheet spaced apart from and in front of said light emitting sites so as to focus the light into arrays of lines, line segments, or columns of pointlike areas, a nonreflective and opaque barrier immediately in front of or between said light sources, configured in such a way as to prevent light from passing through it except at the light source locations, means to adjust the position of said light sources in relation to each other and in relation to the optical element, a passive thin layer of light diffusing means upon which the optical element focuses the light and creates the patterns of light lines or columns of segment or points, and optical anti-reflection means on surfaces between transparent components of different indices of refraction, or on surfaces between transparent components and air, so as to reduce reflections at these surfaces, said illumination system causing different sets of light lines to appear behind the light valve by means of turning different sets of the linear or pointlike light sources on and off according to information provided by the head position sensing device.

15. The device of claim 1 where the light lines are formed by more than one set of small linear light sources or columns of line segment or pointlike light sources spaced across the light line plane, and no lenticular lens or fly's eye lens is present.

16. The device of claim 1 where the head position sensing device consists of an ultrasonic range finding device consisting of at least one emitter and at least two receivers mounted at or near the display and allowing position determination of the observers head through triangulation, using measurements of the time required for ultrasonic impulses to travel from the emitter to the receivers.

17. The device of claim 1 where the position of the observer's head is determined by means of an electromagnetic sensor mounted on the display, which measures the direction and orientation of a electromagnetic field emitted by an electromagnetic emitter mounted on the observers head or headgear.

18. The device of claim 1 where the position of the observer's head is measured by means of an infrared emitter which illuminates the region in front of the display, and two infrared sensors which image the infrared light reflected from an observer's head or a reflective device positioned on the observers head or headgear.

19. The display of claim 1 where the observers head position is determined by the use of infrared, ultrasound, or electromagnetic sensors working in combination.

20. In an autostereoscopic display device having (1) a screen surface upon which is displayed, or imaged, a multiplicity of thin parallel vertical light emitting lines, said surface remaining dark between said emitting lines, (2) a light valve array parallel to and in front of said surface, said light valve having individual picture elements arranged in a regular pattern across its surface, said pattern possessing vertical columns of said picture elements, there being at least two vertical columns of picture elements for each of the light emitting lines, said light emitting line being located behind and between said elements, so as to establish areas of space known to the art as "Viewing zones" in front of the display, within which an observer's eye sees all the light lines behind either an odd or even set of pixel columns, (3) said display optionally being in color obtained by filtering light passing through said picture elements along said columns with filters of at least three colors, and (4) electronic means to cause the left eye image of a stereoscopic image pair to be displayed on the odd or even columns of elements, and the right eye view of the stereoscopic image pair to be displayed on the remaining columns of elements; the improvement which comprises—
   a. incorporating a device capable of monitoring the position of the head of a person who is looking at the display, and
   b. using information from this device to physically move the device which creates or images the light lines horizontally in a direction opposite the direction of the observer's movement by such a distance that the left eye viewing zone moves to follow the observer in such a way that it continues to encompass the position of the observer's left eye, and the right eye zone also follows the observer in such a way that it continues to encompass the position of the observers right eye.

21. The device of claim 20 wherein the illumination system used to create the light lines and cause the light lines to move comprises (1) light emitting sites which are multiple linear light sources or pointlike light sources arranged in columns, (2) a fly's eye or lenticular lens sheet spaced apart from and in front of said light emitting sites so as to focus the light into arrays of lines, line segments, or columns of pointlike areas, (3) a nonreflective and opaque barrier immediately in front of or between said light sources, configured in such a way as to prevent light from passing through it except at the light source locations, (4) means to adjust the position of said light sources in relation to each other and in relation to the optical element, (5) a passive thin layer of light diffusing means upon which the optical element focuses the light and creates the patterns of light lines or columns of segment or points, (6) an optical anti-reflection means on surfaces between transparent components of different indices of refraction, or on surfaces between transparent components and air, so as to reduce reflections at these surfaces, and (7) mechanical means to move the lenticular lens sheet or fly's eye lens horizontally in a direction opposite the direction of the observer's head movement, according to information supplied by the head position sensing device.

* * * * *